US011048742B2

(12) United States Patent
White-Sullivan et al.

(10) Patent No.: US 11,048,742 B2
(45) Date of Patent: Jun. 29, 2021

(54) SYSTEMS AND METHODS FOR PROCESSING ELECTRONIC CONTENT

(71) Applicant: Oath Inc., Dulles, VA (US)

(72) Inventors: Conor F. White-Sullivan, New York, NY (US); Brandon T. Diamond, New York, NY (US); Michael J. DiScala, Brookfield, CT (US); Matthew Conlen, Brooklyn, NY (US); Andrew P. Sass, New York, NY (US)

(73) Assignee: Verizon Media Inc., New York, NY (US)

( * ) Notice: Subject to any disclaimer, the term of this patent is extended or adjusted under 35 U.S.C. 154(b) by 368 days.

(21) Appl. No.: 16/125,356

(22) Filed: Sep. 7, 2018

(65) Prior Publication Data

US 2019/0005040 A1     Jan. 3, 2019

Related U.S. Application Data

(63) Continuation of application No. 15/610,546, filed on May 31, 2017, now Pat. No. 10,102,207, which is a
(Continued)

(51) Int. Cl.
*G06F 17/30*     (2006.01)
*G06F 16/435*     (2019.01)

(52) U.S. Cl.
CPC .......... *G06F 16/435* (2019.01); *G06F 16/437* (2019.01)

(58) Field of Classification Search
CPC .............................. G06F 16/435; G06F 16/437
See application file for complete search history.

(56) References Cited

U.S. PATENT DOCUMENTS 7,849,093 B2    12/2010   Farago
8,539,359 B2 *   9/2013   Rapaport ............... G06Q 30/02
                                                         715/751
(Continued)

OTHER PUBLICATIONS

*Findings—Popular*, Findings, https:/findings.com (Last Visited Mar. 14, 2013).
(Continued)

*Primary Examiner* — Huawen A Peng
(74) *Attorney, Agent, or Firm* — Bookoff McAndrews, PLLC (57) ABSTRACT

Systems and methods are disclosed for processing electronic content, such as text, videos, and images. According to certain embodiments, user interactions with electronic content may be tracked over a plurality of modalities, such as web pages, email, mobile applications, and social media. The tracked user interactions may include copy/paste events, explicit user highlighting, social sharing, and user voting. Key passages of electronic content may be identified based on the tracked user interactions and ranked against one another. Ranking of passages may be based, for example, on a raw or normalized score for the identified key passages. Alternatively, the ranking of a passage may be based on a ratio of user interactions with the passage to total views of the electronic text containing the passage. One or more of the identified key passages (e.g., the highest ranked passages) may be published to one or more applications.

20 Claims, 3 Drawing Sheets

Related U.S. Application Data continuation of application No. 13/836,477, filed on Mar. 15, 2013, now abandoned.

(60) Provisional application No. 61/680,117, filed on Aug. 6, 2012.

(56) References Cited

U.S. PATENT DOCUMENTS

| | | | |
|---|---|---|---|
| 8,887,040 B2 | 11/2014 | Ray | |
| 9,026,476 B2 | 5/2015 | Bist | |
| 2007/0016553 A1 | 1/2007 | Dumais et al. | |
| 2008/0059605 A1 | 3/2008 | Shalev | |
| 2008/0172464 A1 | 7/2008 | Thattai | |
| 2009/0157513 A1* | 6/2009 | Bonev | G06Q 30/02 705/14.69 |
| 2010/0082818 A1 | 4/2010 | Paul | |
| 2011/0040757 A1* | 2/2011 | Kossi | G06F 16/41 707/737 |
| 2011/0145068 A1* | 6/2011 | King | G06F 40/169 705/14.55 |
| 2011/0145327 A1* | 6/2011 | Stewart | G06F 16/58 709/203 |
| 2011/0161242 A1* | 6/2011 | Chung | G06Q 30/0282 705/347 |
| 2011/0276512 A1* | 11/2011 | Asikainen | G06Q 30/0282 705/347 |
| 2013/0262431 A1* | 10/2013 | Garner | G06F 16/435 707/713 |

OTHER PUBLICATIONS

*Most Highlighted Passages of All Time*, amazon.com https://kindle.amazon.com/most_popular (last visited Mar. 14, 2013).

International Search Report for International Application No. PCT/US2013/05084, dated Sep. 2, 2013 (2 pages).

Written Opinion of the International Searching Authority for International Application No. PCT/US2013/05084, dated Sep. 2, 2013 (4 pages).

Communication and Examination Report for European Application No. 13745232.2, dated Feb. 11, 2016 (5 pages).

Liwei He et al., *Auto-Summarization of Audio-Video Presentations*, Oct. 30, 1999 (Oct. 30, 1999), ACM Multimedia, Proceedings of the International Conference, New York, NY, pp. 489-498.

* cited by examiner

Figure 3

SYSTEMS AND METHODS FOR PROCESSING ELECTRONIC CONTENT

This application is a continuation of and claims the benefit of priority to U.S. Nonprovisional patent application Ser. No. 15/610,546, filed on May 31, 2017, which is a continuation of and claims the benefit of priority to U.S. Nonprovisional patent application Ser. No. 13/836,477, filed Mar. 15, 2013, which claims the benefit of priority to U.S. Provisional Patent Application No. 61/680,117, filed Aug. 6, 2012, all of which are incorporated herein by reference in their entireties.

TECHNICAL FIELD

The present disclosure generally relates to analyzing electronic content, including text of an electronic document or web page. More specifically, and without limitation, the exemplary embodiments described herein relate to systems and methods for identifying key passages within electronic content based on, for example, implicit and explicit user behavior.

BACKGROUND

Various techniques exist for analyzing electronic content and identifying key passages. Some of these techniques enable users explicitly to identify phrases or passages that they consider to be of importance. For example, eReaders may provide annotation tools that allow a user to highlight or otherwise mark text in an eBook or other electronic content that the user considers to be particularly interesting. There are also techniques that enable users to capture text and multimedia across different modalities. For example, a user may be able to capture text, images, or video from a web page, scanned document, or photograph.

Tools also exist for facilitating the identification of "quote" passages or passages that correspond to quotes that may be attributed to a particular speaker or other source (e.g., book, news publication, media outlet). Other tools track reader behavior by analyzing copy/paste events. These tools may track the portions of an electronic document (e.g., a web page) that a user copies and pastes, such as by highlighting with the cursor of a mouse or other input device and selecting the "copy" and "paste" functions associated with an application or device. Such information may be used by content creators for business intelligence. Moreover, certain implementations of monitoring users' copy/paste behavior may be used for providing attribution of copied/pasted material to its source (e.g., pasted text automatically includes a link or other information attributing it to the source from which it was copied).

Although the above techniques and solutions are useful in certain applications, each suffers from one or more drawbacks or disadvantages that hinder its suitability for use in other applications. For example, certain known methods of identifying key passages are limited to analyzing literal quotes. Moreover, some solutions are centered on providing analytics to content creators (e.g., publishers, writers) and provide little utility for content users or consumers. For example, methods for analyzing users' copy/paste behavior may provide attribution to a source or provide business intelligence to content creators, but fail to provide useful information to content users or consumers.

SUMMARY

Consistent with the present disclosure, systems and methods are provided for processing electronic content. Embodiments consistent with the present disclosure include computer-implemented systems and methods for processing electronic content based on user interactions with the electronic content. Embodiments consistent with the present disclosure may also overcome one or more of the problems set forth above.

In accordance with one exemplary embodiment, a system is provided for processing electronic content. The system includes a database configured to store user behavior data from a plurality of modalities, the user behavior data being received over an electronic network. The system also includes at least one processor in communication with the database. The processor is configured to identify key passages of electronic content based on the user behavior data. The processor is further configured to rank the identified key passages and publish them to at least one application.

In accordance with another exemplary embodiment, a method is provided for processing electronic content. According to the method, user interactions with electronic content are tracked over a plurality of modalities. Key passages of the electronic content are identified based on the tracked user interactions. The identified key passages are ranked, and at least one of the identified key passages is published to at least one application.

Before explaining certain embodiments of the present disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

As such, those skilled in the art will appreciate that the conception and features upon which this disclosure is based may readily be utilized as a basis for designing other structures, methods, and systems for carrying out the several purposes of the present disclosure. It is important, therefore, to recognize that the claims should be regarded as including such equivalent constructions insofar as they do not depart from the spirit and scope of the present disclosure.

BRIEF DESCRIPTION OF THE DRAWINGS

The accompanying drawings, which are incorporated in and constitute part of this specification, and together with the description, illustrate and serve to explain the principles of various exemplary embodiments.

DETAILED DESCRIPTION

Reference will now be made in detail to the exemplary embodiments implemented according to the disclosure, the examples of which are illustrated in the accompanying drawings. Wherever possible, the same reference numbers will be used throughout the drawings to refer to the same or like parts.

Embodiments herein include computer-implemented methods, tangible non-transitory computer-readable mediums, and systems. The computer-implemented methods may be executed, for example, by at least one processor that receives instructions from a non-transitory computer-readable storage medium. Similarly, systems consistent with the present disclosure may include at least one processor and memory, and the memory may be a non-transitory computer-readable storage medium. As used herein, a non-transitory computer-readable storage medium refers to any type of physical memory on which information or data readable by at least one processor may be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," may additionally refer to multiple structures, such a plurality of memories and/or computer-readable storage mediums. As referred to herein, a "memory" may comprise any type of computer-readable storage medium unless otherwise specified. A computer-readable storage medium may store instructions for execution by at least one processor, including instructions for causing the processor to perform steps or stages consistent with an embodiment herein. Additionally, one or more computer-readable storage mediums may be utilized in implementing a computer-implemented method. The term "computer-readable storage medium" should be understood to include tangible items and exclude carrier waves and transient signals.

Embodiments of the present disclosure provide improved systems and methods for analyzing electronic content, including text of an electronic document or web page, for example. The disclosed embodiments also provide improved systems and methods for analyzing and scoring key passages or portions within electronic content.

In certain embodiments, systems and methods are provided for identifying key passages or portions in electronic content based on implicit and/or explicit user channels or interaction. Such systems and methods may combine known and/or new techniques for identifying key passages in electronic content. Such systems and methods may also provide for a larger pool from which to determine key passages. For example, systems and methods of the present disclosure may provide more reliable identification of key passages or portions by cross-referencing multiple means for determining the importance of candidate passages. Due to the enlarged pool of key passages and enhanced reliability of such an approach, a greater number of applications may utilize such systems and methods for identifying key passages than prior methods or solutions.

Among other features and advantages, the disclosed embodiments include identifying key passages or portions within electronic content by analyzing implicit and/or explicit user behavior across multiple modalities. The disclosed embodiments may be used in a variety of applications, such as automatically generated pull quotes, content highlights or summaries, mobile-friendly content overviews, and analytics.

Figure 1:
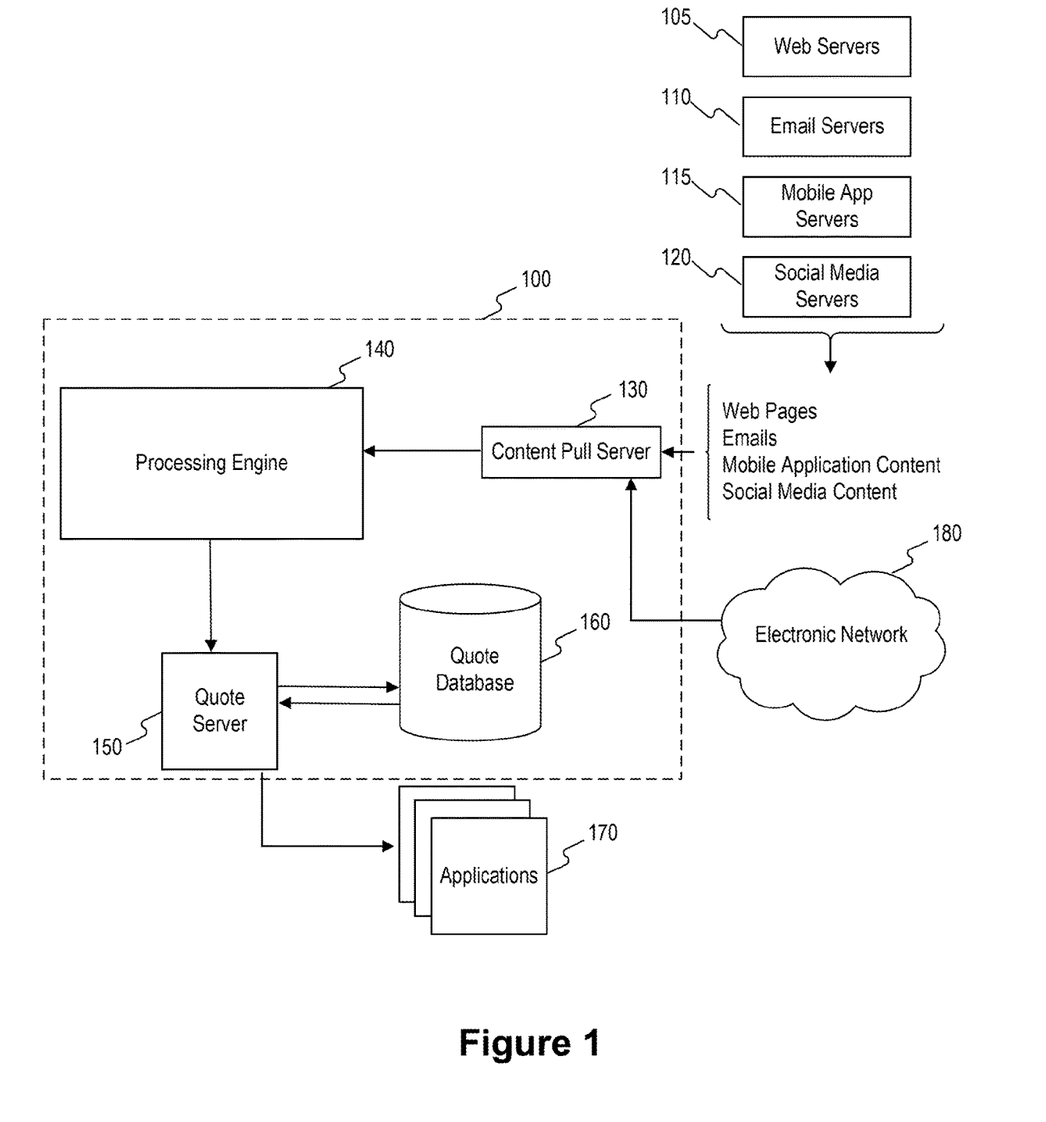
FIG. 1 is a diagram of an exemplary system environment for implementing embodiments consistent with the present disclosure.

FIG. 1 depicts an exemplary system environment for implementing embodiments of the present disclosure. The exemplary embodiment of FIG. 1 includes a system 100. System 100 may include one or more server systems, databases, and/or computing systems configured to receive information from entities in a network, process the information, and communicate the information with other entities in the network. In one embodiment, system 100 may include a content pull server 130, processing engine 140, quote server 150, and quote database 160, as shown in the region within the dashed line labeled 100 in FIG. 1. Further, in one embodiment, system 100 may transmit and/or receive data to/from various other components, such as web servers 105, email servers 110, mobile app servers 115, social media servers 120, applications 170, and electronic network 180. More specifically, system 100 may be configured to receive data over an electronic network (e.g., the Internet), process/analyze the data to identify key passages of electronic content, and forward the identified key passages to applications, so that information regarding the identified key passages may be presented to end users.

The various components of system 100 may include an assembly of hardware, software, and/or firmware, including a memory, a central processing unit ("CPU"), and/or a user interface. Memory may include any type of RAM or ROM embodied in a physical storage medium, such as magnetic storage including floppy disk, hard disk, or magnetic tape; semiconductor storage such as solid state disk (SSD) or flash memory; optical disc storage; or magneto-optical disc storage. A CPU may include one or more processors for processing data according to a set of programmable instructions or software stored in the memory. The functions of each processor may be provided by a single dedicated processor or by a plurality of processors. Moreover, processors may include, without limitation, digital signal processor (DSP) hardware, or any other hardware capable of executing software. An optional user interface may include any type or combination of input/output devices, such as a display monitor, keyboard, and/or mouse.

As described above, system 100 may be configured to receive data over an electronic network, such as the Internet, process/analyze the data to identify key passages of electronic content, and forward information regarding the identified key passages to one or more applications. For example, in one embodiment, system 100 may operate and/or interact with one or more web servers 105, one or more email servers 110, one or more mobile application servers 115, and/or one or more social media servers 120, for the purpose of hosting web pages, email, mobile application content, or social media content for consumers or other users of the Internet. Additionally, or alternatively, system 100 may acquire or form agreements to acquire data from components 105, 110, 115, and/or 120. In addition to components 105, 110, 115, and 120, system 100 may include or interact with other components (not shown in FIG. 1) to obtain electronic content over a network, such as electronic network 180, from which key passages may be identified, in accordance with the embodiments disclosed herein.

In accordance with certain embodiments, system 100 may include a content pull server 130, which may be configured to receive data associated with web pages, emails, mobile application content, social media content, or other electronic data provided by one or more of web servers 105, email servers 110, mobile application servers 115, social media servers 120, or other servers hosting electronic data, such as servers on electronic network 180. Content pull server 130 may compile such information and send it to a processing engine 140 for processing and analytics.

In accordance with certain embodiments, processing engine 140 may comprise a Hadoop cluster including a Hadoop distributed file system ("HDFS") that is configured to stage input data, perform data processing, and store large-volume data output. It will be appreciated that the HDFS may include any desired number or arrangement of clustered machines, as needed to provide suitable efficiency, storage space, and/or processing power. It will be appreciated that any type of distributed processing system may be used in addition or in the alternative to a Hadoop cluster.

In accordance with certain embodiments, processing engine 140 may be configured to identify key passages or portions of electronic content pulled by content pull server 130 from content servers, such as servers 105, 110, 115, and 120, or from other servers or sources on electronic network 180, so as to generate data pertaining to key passages of electronic content for presentation to end users through applications 170. As discussed in further detail below, processing engine 140 may identify key passages or portions of electronic content based on implicit and/or explicit user behavior across multiple modalities. For example, in accordance with certain disclosed embodiments, processing engine 140 may identify key passages of text, images, or videos by tracking one or more of user copy/paste events, social sharing, explicit user highlighting, and user voting.

System 100 may also include a quote server 150, which includes one or more servers configured to receive outputs from processes performed by processing engine 140 and send such outputs to a quote database 160. Quote database 160 may be any suitable type of large scale data storage device, which may optionally include any type or combination of slave databases, load balancers, dummy servers, firewalls, back-up databases, and/or any other desired database components. The processing engine 140, quote server 150, and/or quote database 160 may also be used for providing the identified key passages or portions of text, images, or videos to various applications 170. As discussed in more detail below, applications 170 may be implemented, for example, in the form of a web page, script, plug-in, applet, feed, or mobile application, as well as in any other method for displaying electronic content to a user.

It will be appreciated that any suitable configuration of software, processors, and data storage devices may be selected to carry out the embodiments of system 100. The software and hardware associated with system 100 may be selected to enable quick response to various business needs, relatively fast prototyping, and delivery of high-quality solutions and results. An emphasis may be placed on achieving high performance through scaling on a distributed architecture. The selected software and hardware may be flexible, to allow for quick reconfiguration, repurposing, and prototyping for research purposes. The data flows and processes described herein are merely exemplary, and may be reconfigured, merged, compartmentalized, and combined as desired. The exemplary modular architecture described herein may be desirable for performing data intensive analysis. A modular architecture may also be desired to enable efficient integration with external platforms, such as content analysis systems, various plug-ins and services, etc. Finally, the exemplary hardware and modular architecture may be provided with various system monitoring, reporting, and troubleshooting tools.

In accordance with certain embodiments, processing engine 140 may perform various methods for identifying key passages or portions of electronic content by tracking implicit and/or explicit user behavior. In accordance with certain embodiments, user behavior may be tracked across multiple modalities, such as web pages, email, mobile applications, and social media. In one embodiment, user behavior may be tracked and recorded across multiple modalities in the content of a single body of text. For example, a single news article may be presented to users in a variety of forms, such as a web page, email, mobile application content, or social media content. Indeed, one user may view and interact with a single news article in each of these four modalities. Accordingly, the disclosed embodiments provide for tracking users' interactions with electronic text or other content across each of these modalities.

In accordance with certain embodiments, user behavior is tracked by monitoring user copy/paste events, social sharing, explicit highlighting, and user voting. In each instance, tracking of user behavior may be performed transparently to the user. Alternatively, a user may be made aware of particular instances in which the system is tracking the user's behavior, for example, to allow the user to understand the role of his or her interactions with the text or other content in determining interesting passages of text or other content in an electronic document.

User copy/paste events may be tracked, for example, by using Javascript to detect which pieces of text users are copying and pasting from an electronic document, such as a web page. Embodiments consistent with the present disclosure may also track numerous instances of social sharing, such as, but not limited to, emailing a document, passage or hyperlink; sharing/posting a document, passage, or hyperlink via a social media application (e.g., Facebook, Twitter, Google+, Reddit, Stumbleupon); or commenting on electronic content using a "comment" feature associated with the electronic content. Instances of explicit highlighting of passages of text by a user, such as by graphically emphasizing or annotating displayed text, may also be tracked across multiple modalities. For example, a user may highlight a passage of text by clicking a mouse button and dragging a cursor across the text. Upon releasing the mouse button, a popup window may be displayed to the user next to the highlighted text to confirm the user's desire to mark the highlighted text as a key passage (e.g., a favorite quote). User voting (e.g., via the "Like" function provided by Facebook or the "+1" button provided by Google+) may also be analyzed to identify interesting electronic content, including key passages of text from within electronic content. According to certain embodiments, one or more of these user behaviors may be tracked and recorded in order to identify key passages from within electronic text that users deem interesting. It is to be understood that the disclosed types of user behavior (i.e., copy/paste events, social sharing, explicit highlighting, user voting) may be tracked in accordance with any appropriate means and tracking of such behaviors is not limited to the exemplary methods for tracking user behavior discussed above. Moreover, other forms of user behavior may also be tracked, recorded, and analyzed in order to identify key passages of electronic text, in accordance with the present disclosure.

In accordance with certain embodiments, various statistical techniques and/or machine learning processes are applied to user behavior data to obtain a ranked list of interesting passages or portions of electronic content. For example, passages associated with user behavior are analyzed to identify overlapping pieces of text. Such passages may be totally distinct, totally identical, overlap partially, or overlap completely (i.e., one passage contains the other). This information may be used to determine that the same or similar content is being copied/pasted, highlighted and/or shared across multiple modalities and by multiple users. In one embodiment, the total number of overlaps may be counted to determine a score for each passage.

Further, the machine learning processes may be used to filter (i.e., reject) snippets or passages of text that appear to be invalid. For example, these processes may filter out terms copied solely for use as search terms, instances in which an entire article is copied, and/or very short segments (e.g., a single word that is copied/pasted). In one embodiment, passages of text are filtered out of consideration if they do not contain a verb. Moreover, the machine learning processes may filter passages of text based on a variety of other features, such as the number of words in the passage, number of sentences in the passage, capitalization, presence of quotation marks, presence of ending punctuation, and/or other grammatical analyses. By using these processes, the most important (i.e., "quotable") excerpts of text may be identified and uninteresting passages may be discarded.

In one embodiment, passages of text within an electronic document may be ranked against one another based on the total instances of user interaction with each of those passages. For example, one passage of an article may rank higher than other passages from the same article if that passage has been copied/pasted and/or highlighted by users more than the other passages from the article. Similarly, one passage of an article may rank higher than other passages from different articles if that passage has been copied/pasted and/or highlighted by users more than the other passages from those articles. In another embodiment, ranking of passages may be performed at the user-level, identifying passages that are most interesting to a single user based on a comparison of that user's interactions with a variety of passages from a single electronic document or multiple electronic documents. In yet another embodiment, passages and/or user behaviors associated therewith may be weighted according to certain criteria. For example, in one embodiment, user copy/pasting events may be deemed a more reliable indicator that a passage is a "key" passage than user highlighting of a passage that does not result in a copy/paste event for that passage. Alternatively, explicit user highlighting may be deemed a more reliable indicator of a passage's importance than a user copy/paste event and, thus, weighted more heavily than user copy/paste events.

In one embodiment, each user action may be associated with a point value based on the perceived reliability of the user action as an indicator of a passage's importance. For example, copy/paste events may be assigned a point value of 1.0, explicit user highlighting events may be assigned a point value of 2.0, and user sharing events may be assigned a point value of 1.5. According to this scheme, each time a passage is copied and pasted by any user, 1.0 point value will be added to a raw score for that passage. Similarly, explicit user highlighting events and user sharing events may add 2.0 and 1.5 points, respectively, to the raw score for that passage. Once all user actions associated with a passage have been accounted for and used to create a total raw score for each passage within a given electronic document, the passage(s) with the highest raw score(s) may be identified as the key passage(s) for the electronic document. Moreover, those passages with the highest raw scores across all electronic documents (e.g., all articles) for a given web site may be selected as the key passages for the entire web site. In one embodiment, these raw scores may be normalized prior to comparison across articles to account for factors that may disproportionately favor key passages from some articles (e.g., highly trafficked articles) vis-à-vis other articles (e.g., lesser trafficked articles). For example, each raw score may be converted to a Wilson score to better indicate the likelihood that a random person viewing an article would consider a passage within the article to be interesting, irrespective of the popularity of the article as a whole vis-à-vis other articles on the web site that hosts the article. Alternatively, or additionally, this normalization may be accomplished by weighting the raw score of a passage based, at least in part, on the total number of views of the electronic document or article containing the passage.

In accordance with one embodiment, the ranking of key passages or portions against one another may consider the number of tracked user behaviors (e.g., copy/paste events, highlighting, sharing) for each key passage or portion as compared with the number of page views for the page (e.g., web page) containing the key passage or portion. For example, in one embodiment, a first passage identified as a key passage may be ranked higher (i.e., deemed more interesting) than a second passage if the first passage was copied and pasted by most users who viewed the article containing the passage, regardless of whether the second passage had more copy/paste events overall. This may allow key passages from articles with a smaller number of page views potentially to rank higher than key passages from articles with a higher number of page views, so long as the ratio of copy/paste events (or other tracked user behaviors) to page views is higher for the article with the smaller number of page views than the article with the higher number of page views.

In accordance with another embodiment, the ranking of key passages or portions may be determined, at least in part, by editorial intervention. For example, editors associated with applications 170 may adjust the formula used to rank key passages or portions. These editors may also make manual adjustments to the rankings of key passages portions after they have been automatically ranked in accordance with the embodiments described herein. Editors may manually increase or decrease scores, weights, or rankings assigned to passages to increase or decrease exposure to those passages. This allows a content creator, for example, to guide content consumers to content that the content consumers would likely deem interesting, even if content consumers have not yet expressed enough interest in the content for it to be deemed the most interesting content.

Certain of the disclosed embodiments also provide for post-processing of the key passages to prepare the key passages for publishing to end users via applications, such as applications 170. For example, the identified key passages or portions may be processed to yield text (e.g., "quotes") suitable for publishing to particular applications or modalities. For instance, larger portions of text (e.g., larger "quotes") may be excerpted for publishing to a web page designed for display on a desktop or laptop computer, and smaller portions of text (e.g., smaller "quotes") may be excerpted for publishing to mobile applications. In accordance with one embodiment, variations in content identified as key passages may be resolved as part of the post-processing. For example, if some users copied/pasted and/or highlighted an entire sentence of an electronic document frequently, but other users copied/pasted and/or highlighted only a particular phrase within that sentence frequently, the post-processing may determine whether to display only the particular phrase or the entire sentence based on a comparison of the number of users that performed each action.

The identified quotes may be used in a wide variety of applications, such as, but not limited to, automatically generated summaries, automatically generated pull quotes, automatically generated highlights, mobile-friendly content overviews, a compact news dashboard, quotability analytics, insight into trends in media consumption, viral imagery, teasers, and headline alternatives. Thus, in contrast to prior techniques, which were used primarily to provide analytics to content creators (e.g., publishers and writers), the embodiments consistent with the present disclosure can transform data collected through analysis of user behavior into a new modality suitable for display to content consumers (e.g., readers) in a wide variety of applications. In one embodiment, enhanced analytics may also be provided to content creators, as discussed above (e.g., quotability analytics, article popularity, insight into trends in media consumption, data on social sharing and performance). These analytics may be used by content creators to guide the creation of future content likely to be of interest to content consumers. Content creators may also use the identified key passages in developing advertisements, pull quotes, or teasers for drawing traffic to their content (i.e., drawing users to their web site). Moreover, embodiments consistent with the present disclosure may be used by content creators to help them better to understand their user base, increase recirculation of content, enhance the browsing experience of their web site or mobile application, and/or better understand the content that they should share through social media channels.

In one embodiment, the identified key passages or portions of electronic content may be recirculated, such that the highest ranking (i.e., most interesting) key passages or portions are displayed in a prominent position, as determined by the original creator of the content. For example, the highest ranking passages or quotes from a news and opinion web site may be displayed in a prominent position on that web site's home page. As discussed above, the highest ranking passages or quotes may be determined algorithmically and/or through editorial intervention. In another embodiment, key passages may be displayed to users in a landing page, which may be dedicated primarily to the display of key passages or quotes from throughout a web site, mobile application, etc. For example, a news and opinion web site may provide a landing page within that site that presents key passages or quotes from throughout the web site. Further, the landing page may allow users to filter passages or quotes by type (e.g., news, opinion, sports, science, politics) and navigate to the articles from which the passages or quotes were obtained by clicking on the passages or quotes. In similar fashion, the key passages or quotes may also be displayed in a mobile application, such as in a section within a prominent page or view within the application or in a page or view dedicated explicitly to the display of key passages or quotes. For example, a mobile interface may be provided enabling users to explore news (or other content) using short, mobile-friendly passages or quotes, rather than by exploring the news via longer, less mobile-friendly articles.

Figure 2:
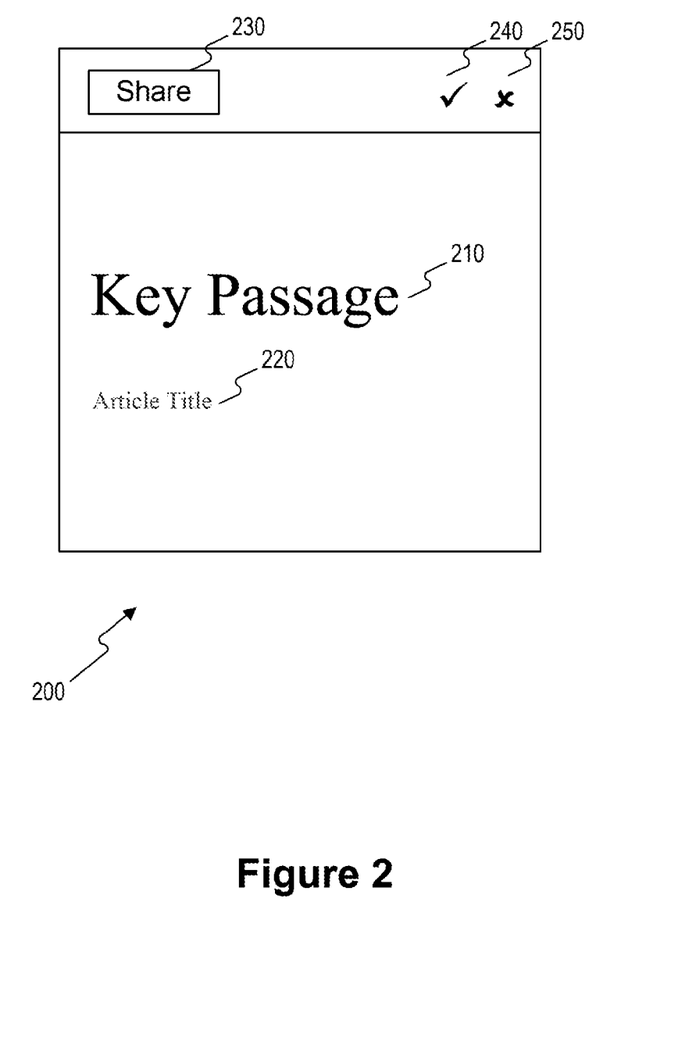
FIG. 2 is an exemplary highlight box depicting publication of an exemplary key passage to an exemplary application, in accordance with an embodiment of the present disclosure.

FIG. 2 is an exemplary highlight box depicting publication of an exemplary key passage to an exemplary application, in accordance with an embodiment of the present disclosure. FIG. 2 depicts an exemplary key passage, as may be displayed to a user in a landing page, in accordance with certain embodiments. As described herein, a landing page may be provided to display key passages of text gathered from many articles published on a web site based on user's interactions with those articles (e.g., copy/paste events, explicit highlighting, social sharing, user voting). Each key passage may be displayed in a separate container within the landing page, such as highlight box 200 in FIG. 2. In addition to the key passage 210, a highlight box may also indicate the title 220 of the article from which the key passage was obtained, as well as other information that may allow a user further to interact with the key passage.

In one embodiment, a highlight box 200 may contain a share button 230 to allow users to share the key passage with others through one or more services, such as Facebook, Pinterest, and Twitter. Highlight box 200 may also contain a boost or like button 240 to enable a user to indicate that he or she likes the key passage 210 (or otherwise finds it interesting). A trash or dislike button 250 may also be provided within highlight box 200 to enable a user to express his or her distaste for or disinterest in the key passage 210. Alternatively, or additionally, the dislike or trash button 250 may be used to cause the key passage 210, and its associated highlight box 200, to be removed from display within the landing page. Thus, a user who navigates away from the landing page and later returns to the landing page may not be presented with the key passage that he or she disliked. Moreover, instances of user sharing, liking/boosting, and disliking/trashing caused by users' interactions with buttons 230, 240, and 250, respectively, may affect a key passage's raw or normalized score, in similar fashion as to that described above. In other words, users interactions via the landing page with passages that have already been identified as key passages may affect whether those passages remain key passages in the future.

In accordance with other disclosed embodiments, users may highlight or quote content throughout the web using a web browser plug-in (e.g., a Google Chrome plug-in or Bookmarklet tool). For example, this feature may allow a user explicitly to highlight a passage of text from any web page viewed in the web browser containing this plug-in to indicate that the passage is of particular interest to the user. In a similar fashion to that described above, information regarding these user highlights may be gathered and processed, such that they may be ranked against one another. In one embodiment, upon reaching a threshold rank (i.e., a threshold number of users has highlighted the passage), these highlights may be reflected in the original web page. Accordingly, all future viewers of the web page may be able quickly to identify a key passage within an article once the passage has been highlighted by viewers of the web page a minimum number of times. In one embodiment, viewers may determine whether to activate this feature, such that the web page may be displayed with or without highlighting applied to the key passages. Further, viewers may determine the manner in which the key passages are highlighted (e.g., underlined, italicized, different color font, different color background). As described above, these explicit highlights may feed into quote database 160. Moreover, as discussed above, the ranking of key passages may give higher weight to these explicit highlights than to copy and paste events, or vice versa.

In accordance with one embodiment, users may share identified key passages as images or text using social media or other channels. For example, a user may share (e.g., via Facebook or Twitter) a particular passage that the user has highlighted using the above-described web browser plug-in by selecting an appropriate button from within the web page or the web browser plug-in. Alternatively, the user may share a particular passage that has been automatically identified as a key passage using the methods described herein and displayed to the user on a "Top Quotes" section of a web page or on a landing page directed to such quotes by selecting a button associated with the key passage on that page.

According to another embodiment, a user may be associated with a user profile to store information regarding the user's interest in certain types of documents (e.g., certain genres of articles) and/or certain passages from within documents. Thus, when a user views an article, the user's profile may be updated to reflect the user's interest in the article. Further, user actions within the article, such as copy/paste events, explicit highlighting, social sharing, and user voting, may be tracked on the user's profile. In one embodiment, the user may be prompted to identify whether the user would like a particular action to be associated with the user's profile, such that the user may prohibit an atypical interaction (e.g., viewing an "uninteresting" article for work/research purposes) from influencing the user's overall profile. In addition to updating a user's profile based on automated observations of the user's actions, a user may also be able manually to edit his or her profile to indicate an interest in certain types of documents, authors, articles, passages, etc. In certain embodiments, information in a user's profile may be analyzed to identify and recommend documents or articles that the user may find interesting based on his or her previous actions (e.g., views of similar articles, highlighting of passages related to other articles).

Figure 3:
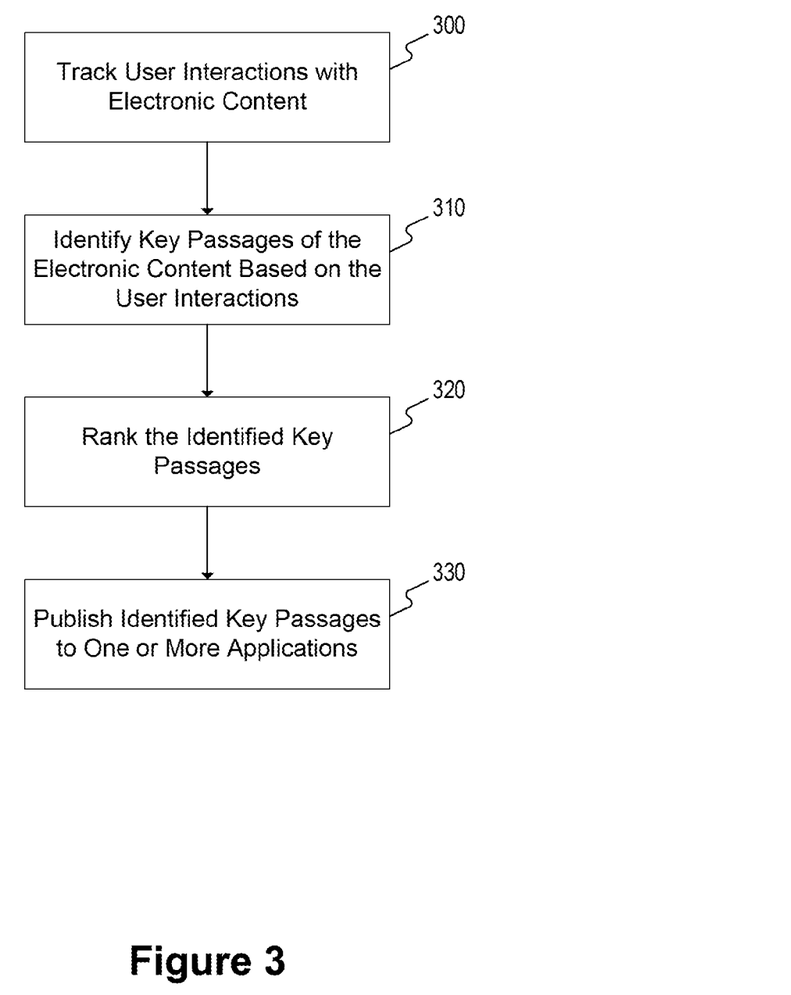
FIG. 3 is a flow diagram depicting an exemplary method for processing electronic content, in accordance with an embodiment of the present disclosure.

FIG. 3 is a flow diagram depicting an exemplary method for processing electronic content, in accordance with an embodiment of the present disclosure. As shown in FIG. 3, user interactions with electronic content are tracked over a plurality of modalities at step 300. For example, user interactions with electronic content, such as text, video, and images, published on web pages, email, mobile applications, and social media through web servers 105, email servers 110, mobile app servers 115, social media servers 120, or through other means, such as other servers on electronic network 180, may be tracked and gathered by content pull server 130.

Key passages of the electronic content may be identified based on the tracked user interactions at step 310. For example, key passages may be identified using processing engine 140 based on one or more of user copy/paste events, explicit highlighting, social sharing, and user voting, as discussed in further detail herein. Moreover, these key passages may be stored using quote server 150 and/or quote database 160. At step 320, the identified key passages are ranked. As discussed above, in one embodiment, a key passage may be ranked based on the ratio of user interactions with a key passage within an electronic text to total views of the electronic text. Alternatively, in another embodiment discussed above, a key passage may be ranked according to a raw or normalized score associated with the key passage. As discussed above, this score may be determined by the number and type of user interactions with the key passage. Moreover, each type of user interaction with the key passage (copy/paste, explicit highlighting, social sharing, user voting) may be assigned a different point value. According to certain embodiments, the identified key passages may be filtered based on one or more of the number of words in the passage, the number of sentences in the passage, the capitalization of the passage, the presence of quotation marks in the passage, and the presence of ending punctuation in the passage.

Key passages may be published to at least one application at step 330. For example, the highest ranked of the identified key passages may be selected for publication to one or more applications. Applications to which key passages may be published include, for example, a landing page (e.g., a web page dedicated to the display of key passages) and a recirculator tool (e.g., a container for display within one or more web pages to highlight a select number of key passages and draw traffic from those pages to other pages within a web site). Moreover, user interactions with key passages published in applications may also be tracked to modify the scores and/or rankings of the key passages in a similar manner to that described above with respect to user interactions prior to publication of a key passage to an application. For example, a user may be enabled to share, like/boost, or dislike/trash a key passage published to an application by using appropriate buttons (e.g., buttons 230, 240, and 250 in FIG. 2) associated with the key passage in the application.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, advantageous results still could be achieved if steps of the disclosed techniques were performed in a different order and/or if components in the disclosed systems were combined in a different manner and/or replaced or supplemented by other components. Other implementations are within the scope of the following exemplary claims.

Therefore, it is intended that the disclosed embodiments and examples be considered as exemplary only, with a true scope of the present disclosure being indicated by the following claims and their equivalents.

What is claimed is:

1. A content filtering system for filtering one or more electronic content elements for distribution to one or more electronic applications, the system comprising:
    a database storing instructions for filtering one or more electronic content items; and
    one or more processors configured to execute the instructions to perform a method, the method including:
    receiving, by a first server processor, one or more electronic content items from a second server processor in electronic communication with the first server processor, the second server processor associated with at least one of a web server, an email server, a mobile application server, and a social media server;
    tracking, by the first server processor, one or more user interactions of a first user with the one or more electronic content items, wherein the first user interacts with the one or more electronic content items across one or more modalities of electronic publishing content;
    receiving, by the first server processor, indication of one or more user interactions by the first user with the one or more electronic content items;
    based on a machine learning model, determining, by the first server processor, one or more key passages of the one or more electronic content items that the first user interacted with;
    determining, by the server processor, a ranking order of the one or more key passages;
    updating, by the first server processor, a user profile associated with the first user to include one of the one or more user interactions and the one or more key passages; and
    based on the updated user profile and the ranking order of the one or more key passages, transmitting, by the first server processor, electronic content information to one or more computer applications associated with the first user.

2. The system of claim 1, further comprising:
    assigning a score to user interactions with the one or more electronic content items.

3. The system of claim 2, wherein assigning a score to a user interaction further comprises:

determining how the first user interacted with the one or more electronic content items; and weighting user interactions according to a predetermined scale.

4. The system of claim 2, wherein assigning a score to user interactions further comprises:

generating a raw score for the one or more electronic content items based on aggregating the scores assigned to the user interactions.

5. The system of claim 1, wherein the user profile is updated further comprising:

receiving a notification from the first user indicating whether the first user has requested the one or more user interactions to be associated with the user profile.

6. The system of claim 4, further comprising:

performing a behavior analysis based on the user interactions and a type of electronic content interacted with by the first user and comparing the user profile to one or more stored profiles of other users; and identifying one or more users with similar behavioral interests based on the behavioral analysis.

7. The system of claim 6, further comprising:

recirculating the electronic content with the highest raw scores to the identified one or more users with similar behavioral interest as the user.

8. A computer-implemented method for filtering one or more electronic content items, the method comprising:

receiving, by a first server processor, one or more electronic content items from a second server processor in electronic communication with the first server processor, the second server processor associated with at least one of a web server, an email server, a mobile application server, and a social media server;

tracking, by the first server processor, one or more user interactions of a first user with the one or more electronic content items, wherein the first user interacts with the one or more electronic content items across one or more modalities of electronic publishing content;

receiving, by the first server processor, indication of one or more user interactions by the first user with the one or more electronic content items;

based on a machine learning model, determining, by the first server processor, one or more key passages of the one or more electronic content items that the first user interacted with;

determining, by the server processor, a ranking order of the one or more key passages;

updating, by the first server processor, a user profile associated with the first user to include one of the one or more user interactions and the one or more key passages; and based on the updated user profile and the ranking order of the one or more key passages, transmitting, by the first server processor, electronic content information to one or more computer applications associated with the first user.

9. The method of claim 8, further comprising:

assigning a score to user interactions with the one or more electronic content items.

10. The method of claim 9, wherein assigning a score to a user interaction further comprises:

determining how the first user interacted with the one or more electronic content items; and weighting user interactions according to a predetermined scale.

11. The method of claim 9, wherein assigning a score to user interactions further comprises:

generating a raw score for the one or more electronic content items based on aggregating the scores assigned to the user interactions.

12. The method of claim 8, wherein the user profile is updated further comprising:

receiving a notification from the first user indicating whether the first user has requested the one or more user interactions to be associated with the user profile.

13. The method of claim 11, further comprising:

performing a behavior analysis based on the user interactions and a type of electronic content interacted with by the first user and comparing the user profile to one or more stored profiles of other users; and identifying one or more users with similar behavioral interests based on the behavioral analysis.

14. The method of claim 13, further comprising:

recirculating the one or more electronic content items with the highest raw scores to the identified one or more users with similar behavioral interest as the first user.

15. A non-transitory computer-readable medium storing instructions for filtering one or more electronic content elements for distribution to one or more electronic applications, the instructions configured to cause at least one processor to perform operations, the operations including:

receiving, by a first server processor, one or more electronic content items from a second server processor in electronic communication with the first server processor, the second server processor associated with at least one of a web server, an email server, a mobile application server, and a social media server;

tracking, by the first server processor, one or more user interactions of a first user with the one or more electronic content items, wherein the first user interacts with the one or more electronic content items across one or more modalities of electronic publishing content;

receiving, by the first server processor, indication of one or more user interactions by the first user with the one or more electronic content items;

based on a machine learning model, determining, by the first server processor, one or more key passages of the one or more electronic content items that the first user interacted with;

determining, by the server processor, a ranking order of the one or more key passages;

updating, by the first server processor, a user profile associated with the first user to include one of the one or more user interactions and the one or more key passages; and based on the updated user profile and the ranking order of the one or more key passages, transmitting, by the first server processor, electronic content information to one or more computer applications associated with the first user.

16. The computer readable medium of claim 15, further comprising:

assigning a score to user interactions with the one or more electronic content items.

17. The computer readable medium of claim 16, wherein assigning a score to a user interaction further comprises:

determining how the first user interacted with the one or more electronic content items; and weighting user interactions according to a predetermined scale.

18. The computer readable medium of claim 16, wherein assigning a score to user interactions further comprises:
   generating a raw score for the one or more electronic content items based on aggregating the scores assigned to the user interactions.

19. The computer readable medium of claim 18, further comprising:
   performing a behavior analysis based on the user interactions and a type of electronic content interacted with by the first user and comparing the user profile to one or more stored profiles of other users; and
   identifying one or more users with similar behavioral interests based on the behavioral analysis.

20. The computer readable medium of claim 19, further comprising:
   recirculating the one or more electronic content items with the highest raw scores to the identified one or more users with similar behavioral interest as the first user.

* * * * *